Dec. 12, 1939.   H. H. MORETON   2,183,463
METHOD AND APPARATUS FOR DESTROYING SEWAGE
Original Filed Feb. 20, 1936   2 Sheets-Sheet 1

Patented Dec. 12, 1939

2,183,463

UNITED STATES PATENT OFFICE 2,183,463

METHOD AND APPARATUS FOR DESTROYING SEWAGE

Henry H. Moreton, Montclair, N. J.

Substituted for abandoned application Serial No. 64,982, February 20, 1936. This application August 12, 1938, Serial No. 224,610

9 Claims. (Cl. 110—15)

This invention is a method and apparatus for destroying sewage and similar refuse material.

Sanitary engineers have long recognized that satisfactory sewage disposal and destruction cannot be accomplished unless water and/or soil pollution is completely avoided. Attempts heretofore made to physically destroy sewage have met with indifferent success from the standpoint of practical economy, convenience in handling, and complete sanitary safety, so that at the present time, the so-called bacterial systems are considered the safest and most desirable methods for municipal installations. Systems of the bacterial type, however, involve the installation of very expensive apparatus which must be spread over a wide area, thereby involving large investments to meet the initial costs of installation and expense of operation.

One of the objects of the present invention is to effect complete and economical physical destruction of sewage by incineration, whereby practically no residue is left, so that the possibility of either soil or water pollution is reduced to the absolute minimum. A further object is to provide for complete incineration of sewage in such manner that the discharge of objectionable and offensive odors, smokes and gases into the surrounding atmosphere is prevented. A further object is to provide a system of low installation cost and highly economic operation, capable of effecting complete incineration of the sewage in a continuous process, and to employ the caloric values inherent to the sewage being treated so as to assist in the incineration of the organic constituents.

The invention will be hereinafter fully set forth and particularly pointed out in the claims.

In the accompanying drawings—

Figure 1:
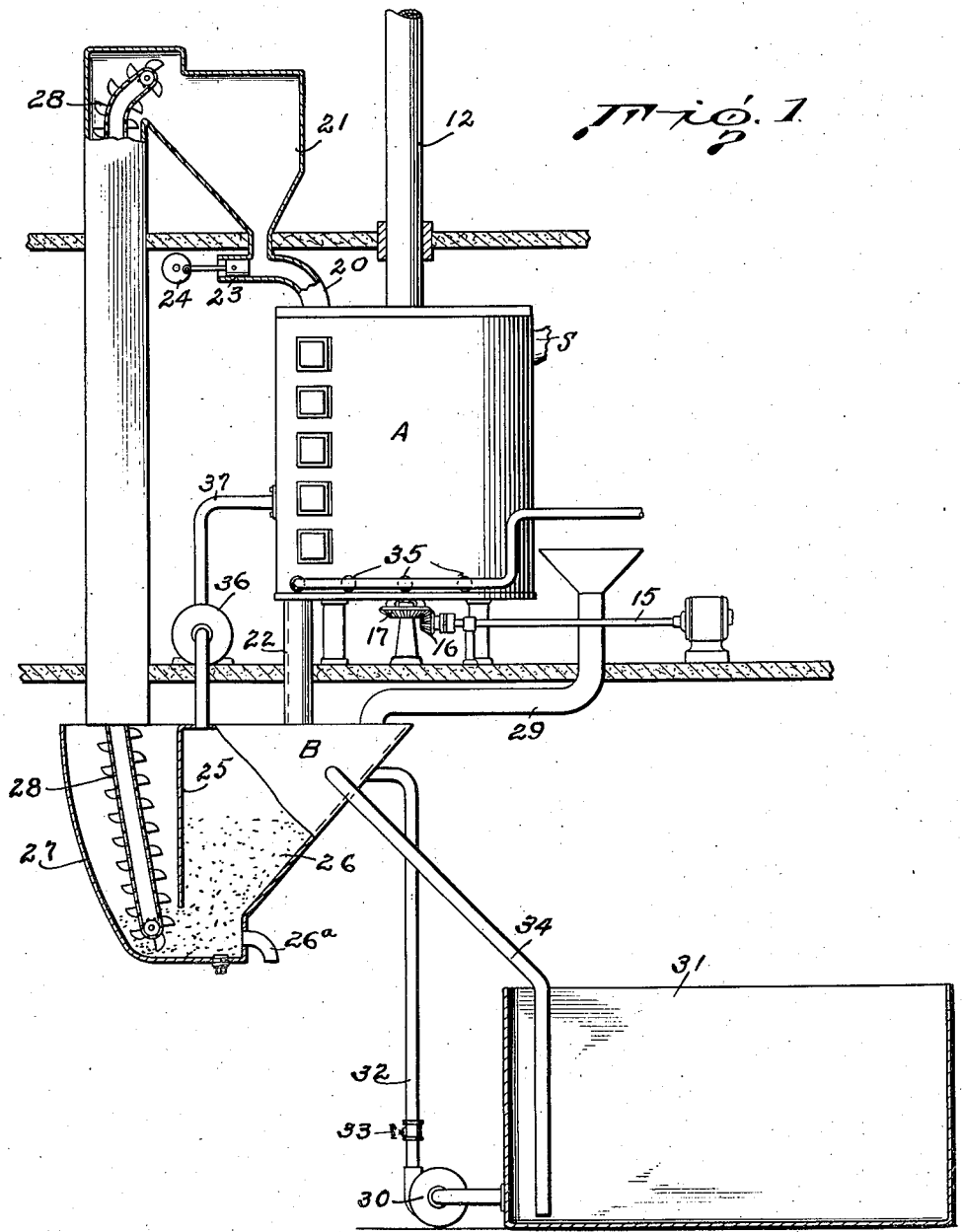
Figure 2:
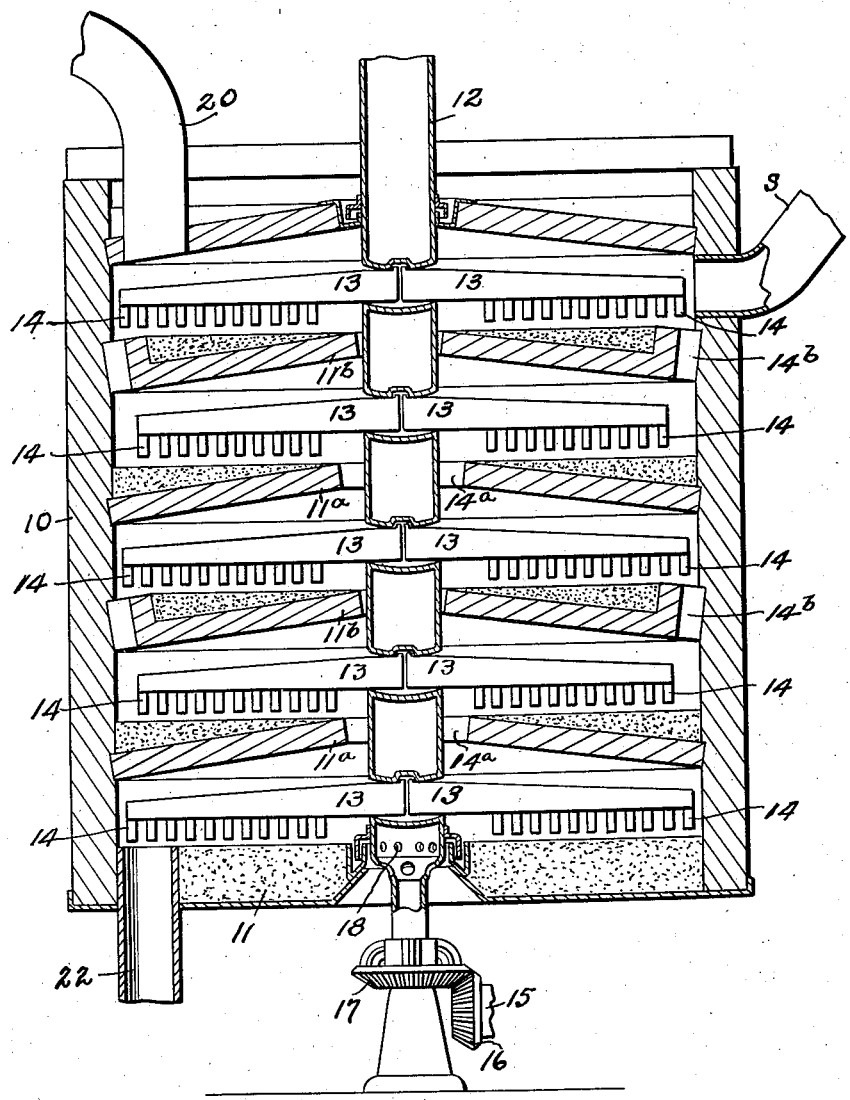

Figure 1 is a vertical elevation more or less diagrammatic in character, illustrating an apparatus constructed in accordance with the invention, certain parts being shown in section. Figure 2 is a vertical sectional view of the furnace.

Referring to the drawings, A designates a furnace of the well known "Herreshoff" type, the same comprising a cylindrical shell 10 of metal, lined with refractory material, the bottom of the furnace constituting a roasting hearth 11. Located above the hearth 11 and in vertically spaced relation are a plurality of additional roasting hearths 11$^a$ and 11$^b$. Passing through the hearths and the top 11$^c$ of the furnace is a hollow, centrally located vertical shaft 12, said shaft carrying a plurality of sets of radially disposed stirring arms 13, one set for each hearth, said arms having depending fingers 14 positioned to engage and stir material which may be deposited upon the hearths. It will be observed that the hearths 11$^a$ are provided with central openings 14$^a$, and that the hearths 11$^b$ are provided with peripheral openings 14$^b$. By this arrangement the material on the uppermost hearth is delivered through the opening 14$^a$ upon the next lower hearth, and then through the opening 14$^b$ of said next lower hearth to the hearth immediately below it, so that the material takes a zigzag course in its travel from the top to the bottom of the furnace. The shaft may be rotated in any suitable or desired manner, for instance by means of a driving shaft 15, provided with a bevel gear 16, meshing with a similar gear 17 connected to the shaft 12. Said shaft 12 is also ventilated in any suitable or desired manner, for instance, by means of perforations 18 in the lower end thereof. Material is delivered into the top of the furnace by means of a pipe 20 leading from the lower end of a hopper 21, and at the bottom of the furnace the material is discharged through a chute 22 as shown. The feed from the hopper 21 through the pipe 20 is preferably made positive by means of a piston device 23 operated by a suitable motor 24, as shown.

The outlet chute 22 delivers material from the furnace into a bin or tank B, which is provided with a depending baffle 25, so as to divide the bin into a receiving chamber 26 and an outlet chamber 27. A suitable conveyor 28 of any desired type lifts the material from the bin B at a position below the lower edge of the baffle 25 and at its upper end delivers the same into the hopper 21. An auxiliary chute 29 also communicates with the bin B and if desired, an effluent discharge 26$^a$ may be employed.

Sewage sludge is delivered to the upper portion of the chamber 26 by means of a pump 30, having its inlet connected with a sludge tank 31, and its outlet end connected by a pipe 32 with the chamber 26. If desired, a valve 33 may be employed to shut off the flow of sludge to the chamber 26. Any excess sludge may drain off from the chamber 26 through the drain pipe 34 to the tank 31.

In operation, heat is initially supplied to the lower end of the furnace A by means of one or more suitable gas burners 35, supplied from any suitable source, but preferably from the septic tanks in which the sewage is stored, if such gas is available. An initial charge of sand or similar non-absorptive inorganic granular material, capable of withstanding high temperature without fusing is introduced into the bin B, through the chute 29. It is preferred to use a good sharp silica sand, and sufficient sand must be initially introduced to provide a charge of granular material of sufficient volume to be continuously passed from the bin B to the hopper 21 and to maintain a supply of said material upon each of the hearths. Assuming that the burners 35 have been ignited and that sand is being deposited into the bin B, the elevator 28 is put into operation, so that sand is continuously elevated and deposited into the top of the furnace. At the same time, the stirrers 13 are started and are continuously actuated, so as to sweep the sand over the hearths and cause it to travel downwardly through the furnace. During such travel a high temperature is imparted to the sand by the burners 35, so that the sand has practically reached an incandescent temperature as it is discharged through the chute 22.

As soon as the chamber 26 of the bin B is partially filled by heated sand discharged from the furnace through chute 22, the supply of sand through chute 29 is discontinued. At this stage, the pump 30 is started, so as to deliver sewage from tank 31 into the bin B and on top of the sand in the chamber 26.

As the sewage material is deposited upon the heated sand in the chamber 26, the hot sand causes volatilization of a part of the sewage moisture, and as the sand and sewage travel downwardly through said chamber under the influence of the action of the elevator 128, the sand and sewage become intimately mixed and the sand particles become coated with colloidal sewage constituents.

As the mixed sewage and refractory material are discharge into the top of the furnace, they are deposited upon the topmost hearth 11b, and the stirrer arms 30 move around the chamber and outwardly to the opening 14b, causing the mixture to fall upon the next lower hearth 11a, at which location the stirrer arms move the material around the chamber and inwardly to the central opening 14a, through which it is discharged to the next lower hearth, and so on until it passes out of the chute 22. It is to be understood that during the operation of the furnace the conveyor elevator 28 constantly discharges a supply of the mixture of sand and sewage upon the top hearth of the furnace. It will be understood that the mixed sand and sludge travel downwardly from the top to the bottom of the furnace, having its travel interrupted at various horizontal planes at which planes the mixture is stirred and moved horizontally, the surface coatings on the sand particles will first become completely dehydrated, and the remaining moisture of the residual sewage is quickly driven off until complete dehydration of the mixture is effected. In this way the material is completely dehydrated before it has travelled more than half way through the furnace, and as the travel progresses the heat within the zones through which the mixture must pass causes the organic constituents of the sewage to burst into flames, and thereby burn off the colloidal coatings and to completely incinerate the residual sewage, so that by the time the sand has reached the bottom of the furnace and is delivered through the chute 22, it is approximately free of any of the sewage initially introduced into it. The smoke and products of combustion pass out through the stack S and any fumes which may develop during the incineration of the sewage as well as the fumes delivered into the furnace through the pipe 31 are ignited and used in maintaining the furnace at the desired temperature. The sand which is returned to the bin B after the incinerating process, although it is never subjected to a fusing temperature, is completely free of sewage constituents and is then started through another cycle, being constantly mixed with newly supplied sewage sludge, and elevated by the conveyor 28, the operation being continuous as long as the supply of sewage is maintained.

The advantages of the invention will be readily understood by those skilled in the art to which it belongs. An important advantage is that in the initial stage of each cycle, there is a partial dehydration, and the non-absorptive particles of the granular material become surface-coated with colloidal sewage material. Therefore, during the passage of the mixture through the furnace, it is easy to so control its capacity that final dehydration is evenly effected. For this reason, after the apparatus has once been placed in operation, less initial heat is required at the burner than would otherwise be needed, thereby preventing fusing of the sand, and yet maintaining a sufficiently high temperature thereof to insure complete combustion of the sewage material, so that as the sand leaves the incinerator it is in a condition which will permit of its immediate remixture with more sewage, to be returned to the furnace for a new dehydrating and incinerating cycle. Another advantage is that as the mixture of sewage and heated sand is subjected to the heat of the furnace, said mixture will first give off such moisture as remains therein after the initial volatilization of moisture which has been effected in the chamber 26, and later will be completely dehydrated and incinerated, the combustible gases given off during those stages being capable of developing sufficient B. t. u.'s to very materially aid in the destruction of following sewage. Another advantage is that the dehydration and incinerating steps are greatly facilitated by the periodical interruption of the downward travel of the mixture and the stirring thereof at the interrupting locations.

This case is a substitute for application Serial Number 64,982 filed February 20, 1936.

Having thus explained the nature of the invention and described an operative manner of constructing and using the same, although without attempting to set forth all of the forms in which it may be made, or all of the forms of its use, what is claimed is:

1. A method of destroying sewage comprising mixing the sewage with heated granular refractory material in such manner as to coat said particles with colloidal sewage constituents, causing the mixture of coated granular material and the residual sewage to travel downwardly through a heated space, periodically arresting said downward travel at different horizontal levels within said space, maintaining said space at such a temperature as to first dehydrate the mixture and then completely incinerate the combustible constituents thereof during such travel, and discharging the sewage-free granular refractory material from the lower end of said space.

2. A method of destroying sewage comprising mixing the sewage with a heated granular refractory material in such manner as to coat said particles with colloidal sewage constituents, causing the mixture of coated granular material and residual sewage to travel downwardly through a heated space, periodically arresting said downward travel at different horizontal levels within said space, agitating the mixture by imparting horizontal movements thereto at each of said levels, maintaining said space at such a temperature as to first dehydrate all of the sewage and then completely incinerate the combustible constituents thereof during such travel, and discharging the sewage-free granular refractory material from the lower end of said space.

3. A method of destroying sewage comprising mixing the sewage with heated granular refractory material in such manner as to coat said particles with colloidal sewage matter, causing the mixture of coated granular material and the residual sewage to travel downwardly through a heated space, periodically arresting said downward travel at different horizontal levels within said space, maintaining said space at such a temperature as to first dehydrate the colloidal coatings and residual sewage constituents and then completely incinerate all of the dehydrated combustible constituents during such travel, causing the heat produced by the incineration of the combustible constituents of the sewage to aid in maintaining the desired temperature within said space, said incineration taking place in the lower portion of said space, and discharging the sewage-free granular refractory material from the lower end of said space.

4. A method of destroying sewage comprising mixing the sewage with heated granular refractory material in such manner as to surface coat the particles of said refractory material with colloidal constituents of the sewage, causing the mixture of coated particles and residual sewage to travel downwardly through a heated space and periodically arresting said downward travel at different horizontal levels within said space, heating said space in such manner as to maintain a temperature which will first dehydrate the surface coatings and the residual sewage and then completely incinerate the combustible constituents during the downward travel of the mixture through said space, and discharging the sewage-free granular refractory material from the lower portion of said space.

5. A method of destroying sewage comprising heating a granular refractory material, mixing the hot granular material with sewage, and in such manner as to provide the particles of granular material with coatings of colloidal sewage, conducting away from the mixing position any gases or vapors which may develop, causing the hot mixture of coated granular material and residual sewage to travel downwardly through a heated space, periodically arresting said downward travel at different horizontal levels within said space, initially heating said space to such a temperature as to first dehydrate the colloidal coatings and residual sewage, and subsequently completely incinerate the dehydrated material during such downward travel, burning said gases and vapors within said space, causing the heat produced by the combustion of the said gas and vapor to aid in maintaining the desired temperature within said space, and discharging the sewage-free granular refractory material from the lower portion of said space.

6. In an apparatus for destroying sewage, the combination with a furnace provided with a plurality of vertically spaced approximately horizontal hearths each having an outlet opening for delivering material to the next lower hearth, of means for mixing sewage with heated granular material, means for collecting gas and vapors generated during the mixing stage, means for introducing the mixture on to the topmost hearth through said feed opening, means for causing said mixture to travel downwardly from one hearth to another until the granular material is discharged from the furnace, means for maintaining an incinerating temperature within said furnace, and means for introducing said gas and vapors into the furnace in such manner as to assist in maintaining said incinerating temperature.

7. In an apparatus for destroying sewage, the combination with a furnace provided with a plurality of vertically disposed approximately horizontal hearths each having an outlet opening for delivering material to the next lower hearth, means for mixing the sewage with heated granular material, means for introducing the mixture onto the topmost hearth through said feed openings, means for causing the mixture to travel downwardly from one hearth to another until the granular material is discharged from the furnace, and burners for said furnace.

8. In an apparatus for destroying sewage, the combination with a furnace provided with a plurality of vertically spaced approximately horizontal hearths, each having an outlet opening for delivering material to the next lower hearth, said furnace having a top feed opening and a lower delivery opening, a mixing chamber connected with the delivery opening of said furnace, means for introducing a charge of heated refractory inorganic granular material into said mixing chamber so as to provide a filter bed, means for drawing off liquids from the lower end of the filter bed, means for introducing sewage into said chamber in such manner as to mix it with said heated granular material, means for withdrawing said mixture from said chamber and delivering it onto the topmost hearth of the furnace, means for causing said mixture to travel downwardly from one hearth to another until the granular material is discharged from the furnace into said mixing chamber, and means for igniting any combustible gases generated within said chamber.

9. In an apparatus for destroying sewage, the combination with a furnace provided with a plurality of vertically spaced approximately horizontal hearths, each having an outlet opening for delivering material to the next lower hearth, of a mixing tank below said furnace, means for delivering heated material from the bottom of said furnace into said mixing tank, means for introducing a charge of inorganic refractory granular material into said mixer, means for introducing sewage into the mixer, means for withdrawing the mixture from said mixer and introducing it onto the topmost hearth of the furnace, means for causing said mixture to travel downwardly from one hearth to another until the granular material is discharged from the furnace to the mixer, means for conducting combustible gases from said mixer to said furnace, means for draining excess sewage from said mixer, means for draining effluent from said mixer, and burners for said furnace.

HENRY H. MORETON.